Jan. 20, 1948.                E. C. MOSS ET AL                 2,434,744
                              ASSEMBLING APPARATUS
                              Filed June 22, 1944           2 Sheets-Sheet 1
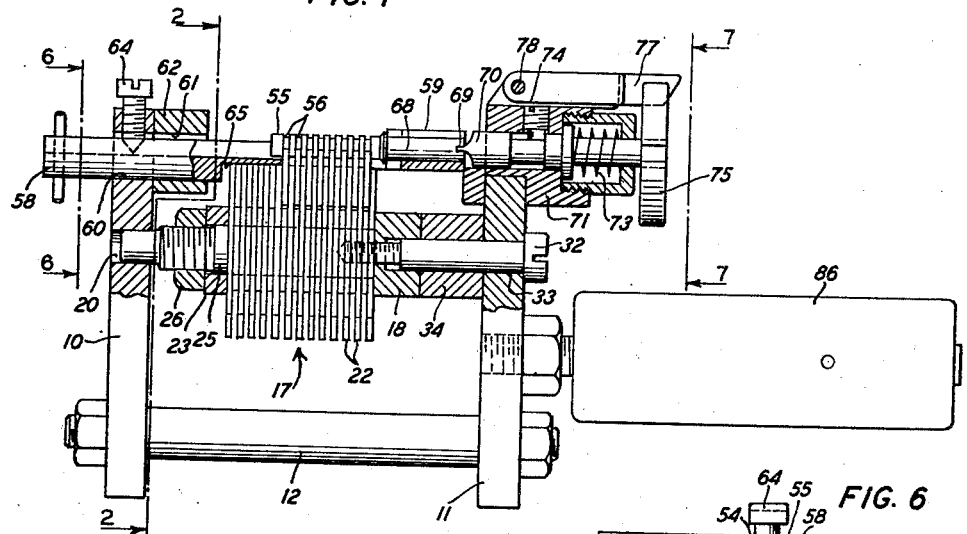
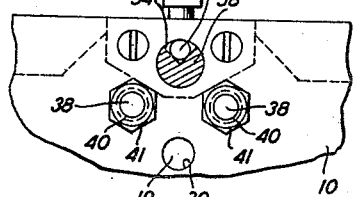
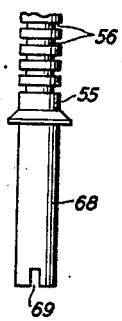
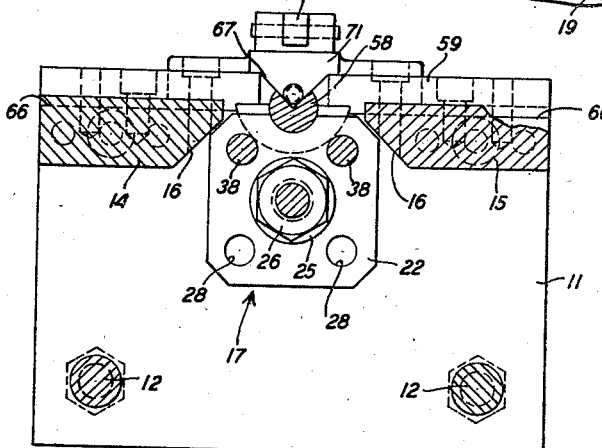
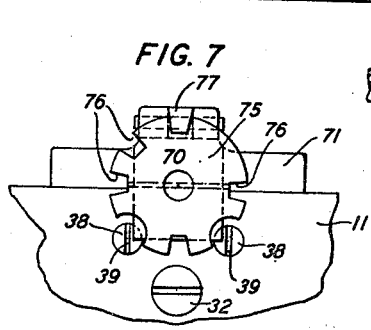
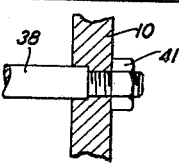
INVENTORS
E. C. MOSS
H. W. SCHAUFELBERGER
BY
E. R. Nowlan
ATTORNEY Jan. 20, 1948.  E. C. MOSS ET AL  2,434,744
ASSEMBLING APPARATUS
Filed June 22, 1944  2 Sheets-Sheet 2
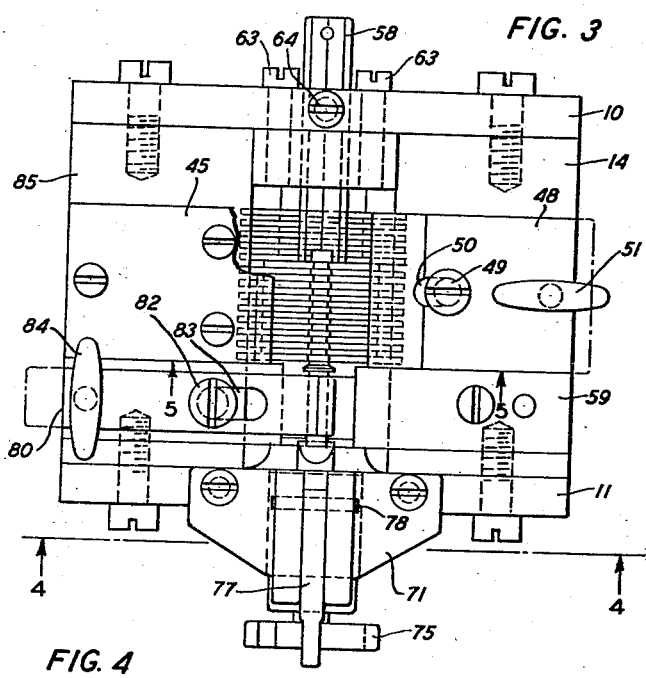
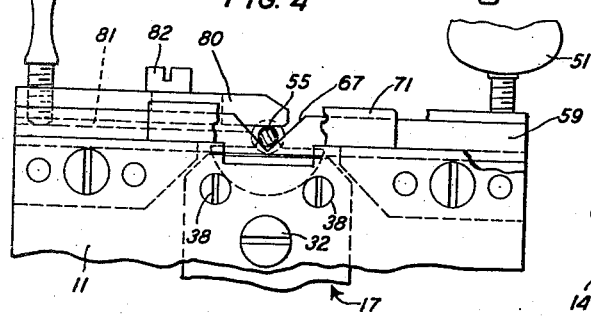
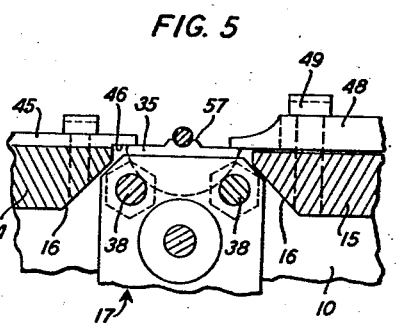
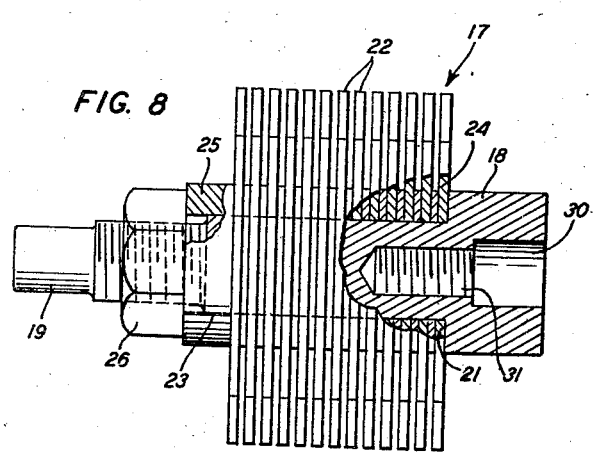
INVENTORS
E. C. MOSS
H. W. SCHAUFELBERGER
BY
E.R. Nowlan
ATTORNEY Patented Jan. 20, 1948

2,434,744

UNITED STATES PATENT OFFICE 2,434,744

ASSEMBLING APPARATUS

Earl C. Moss, Westfield, and Henry W. Schaufelberger, Union, N. J., assignors to Western Electric Company, Incorporated, New York, N. Y., a corporation of New York Application June 22, 1944, Serial No. 541,528

5 Claims. (Cl. 113—99)

This invention relates to assembling apparatus, and more particularly to apparatus for assembling variable condensers.

In the manufacture of variable condensers it is of utmost importance that the plates of the rotor as well as the stator be uniformly spaced and mounted parallel with each other.

An object of the invention is to provide a simple, efficient and highly practical assembling apparatus particularly adapted for assembling condensers.

With this and other objects in view, the invention comprises an assembling apparatus comprising a unit for locating parts in given relative positions with respect to an element to which they are to be secured, companion supporting elements for the latter, and means to clamp the parts in place for assembly by suitable means such as soldering.

Other objects and advantages will be apparent from the following detailed description when considered in conjunction with the accompanying drawings, wherein Fig. 1 is a side elevational view of the assembling apparatus, portions thereof being shown in section;

Fig. 2 is a vertical sectional view taken substantially along the line 2—2 of Fig. 1;

Fig. 3 is a top plan view of the assembling apparatus with the handle therefor removed;

Fig. 4 is a fragmentary sectional view taken substantially along the line 4—4 of Fig. 3;

Fig. 5 is a fragmentary detail view of a portion of the apparatus;

Fig. 6 is a fragmentary sectional view taken along the line 6—6 of Fig. 1;

Fig. 7 is a fragmentary detail view taken substantially along the line 7—7 of Fig. 1;

Fig. 8 is a top plan view partially in section of the locating unit;

Fig. 9 is a fragmentary detail view of the supporting element or shaft to which the plates of the condenser are to be secured, and Fig. 10 is a fragmentary detailed sectional view of a portion of one of the supporting elements.

Referring now to the drawings, the apparatus includes parallel vertical members 10 and 11 secured together in their spaced positions adjacent their lower portions by spacing bolts 12 and at their upper portions by connecting members 14 and 15. The connecting members 14 and 15 have their inner bevelled ends 16 spaced from each other as illustrated in Figs. 2 and 5, to allow for the adjustment of the locating unit indicated generally at 17.

The unit 17 (Figs. 1 and 8) includes a central member 18 having a reduced end 19 rotatably disposed in an aperture 20 of the vertical member 10. The opposite end of the central member is enlarged, providing a shoulder 21 against which one of a plurality of positioning elements 22 is disposed when mounted upon a central portion 23 of the member. The elements 22 are identical in structure and of the contours illustrated particularly in Fig. 2, centrally apertured for the portion 23 and spaced like distances from each other by spacing members or washers 24. The elements 22 and their spacing members 24 are held in place upon the portion 23 through the aid of a collar 25 and a nut 26 to form locating pockets for parts to be assembled. The elements 22, as illustrated in Fig. 2, have equally spaced aligned apertures 28 adjacent the bevelled corners thereof for a purpose hereinafter described. The enlarged end of the central member 18 is apertured, as at 30, a portion of which is threaded, as at 31, to receive a mounting screw 32, the latter being disposed in an aperture 33 of the vertical member 11 and extending through a spacing collar 34 as illustrated in Fig. 1. The unit 17 serves to properly space parts 35, which in the present embodiment are the rotor plates for a variable condenser, from each other.

Associated with the unit are supporting rods or elements 38 which have their forward ends, as shown in Figs. 4 and 7, provided with screw driver slots 39, while their rearmost ends have reduced threaded portions 40 receivable in counterbored apertures of the vertical member 10 (Fig. 10) and held in place by nuts 41. The elements 38, therefore, as illustrated in Fig. 2, extend through the uppermost pair of apertures 28 in the locating elements 22 of the unit 17 and serve to support the parts 35 to be assembled, the parts engaging the elements substantially tangentially. The purpose of mounting the supporting elements 38 in the manner described is to enable the operator to adjust these elements should they become worn, through constant use, to present new portions to the positions where they will be engaged by the parts to be assembled. This may be accomplished through the loosening of the nuts 41 and the turning of the supporting elements short distances. Due to the fact that the parts 35 engage the supporting elements 38 only at exceedingly small portions of the peripheries of the latter, only small movements thereof are necessary to position new surfaces to the supporting positions. The purpose of the four holes in each of the elements 22 of the unit 17 is to make possible the adjustment of the unit so that it may provide four locating areas for the assembling position, the adjustment of the unit being made possible merely by the loosening of the screw 32, the removal of the elements 38, and the turning of the unit to the new position, after which the screw 32 may be tightened and the elements 38 again disposed in place.

The member 14 has a fixed stop or locating member 45 mounted thereon with a surface 46 (Fig. 5) positioned to be engaged by the adjacent flat edges or surfaces of the parts 35 to be assembled. A movable clamp 48, normally held on the member 15 through the aid of a screw 49, which extends through an elongate aperture 50 (Fig. 3) in the clamp, conditions the clamp for movement into registration with the opposing flat edges or surfaces of the parts 35. Through the aid of a thumb screw 51, threadedly carried by the clamp 48 and movable into engagement with the upper surface of the member 15, the clamp is rocked against the head of a screw 49 to move the inner end thereof into engagement with the parts 35 to move them uniformly into engagement with the surface 46 of the fixed stop or member 45. Through this means the parts 35 may be removably and accurately located through the aid of the unit 17 in given spaced positions upon the supporting elements 38 for assembly.

In the present embodiment the rotor unit for a variable condenser is being assembled. The shaft therefor is indicated at 55 and has a plurality of annular grooves 56 therein to receive portions 57 of the plates 35, which portions have annular recesses to conform to the inner diameters of the shaft at the grooves. The shaft 55 is to be secured to the plates 35 by soldering, and it is important in the assembling of these parts that they not only be properly positioned with respect to each other but that a small clearance exist between the inner peripheries of the shaft and the recesses to allow for the passage of liquid solder therethrough. There are two supporting elements identified by reference numerals 58 and 59 for supporting the ends of the shaft 55 at opposing sides of the group of plates 35. The element 58 is of the contour shown in Figs. 1, 2, 3 and 6, cylindrical in general contour, with a V-shaped groove 54 extending longitudinally thereof in which the shaft 55, particularly the inner end thereof, is to rest. The element 58 extends through an aperture 60 in the upright 10 and through an aperture 61 in a bracket 62 which is fixed to the upright 10 through the aid of screws 63, the element 58 being held in any suitable position through the aid of a set screw 64. It will be noted that the inner portion of the element 58 is cut away, at 65, to extend over the unit 17 a desired distance depending upon the length of the shaft 55 and the number of plates 35 to be included in the article being assembled. The element 59 extends the full width of the apparatus and is positioned in grooves 66 of the members 14 and 15, where it is secured in place. A V-shaped groove 67 is disposed in the element 59 at the center thereof and in alignment with the groove 54 of the element 58. The element 59, therefore, supports a forward portion 68 of the shaft 55 in the forward end of which is disposed a tool receiving slot 69. In actual structure it is important that this tool receiving slot extend in a given direction or at a given angle with respect to the flat surfaces of the plates 35. These angles may vary with like structures depending upon their subsequent use, so that the condensers of which they are to be a part may be readily adjusted to known values.

Means for positioning the shafts 55, during the successive assemblies of the rotors, includes a locating element 70 having a reduced end receivable in the slot 69, as illustrated in Figs. 1 and 3, axially movable in a bracket 71 which is mounted upon the upper edge of the upright 11, as illustrated in Figs. 1, 2 and 3. A spring 73 normally urges the element 70 inwardly into a holding position, limited in its movement through the aid of a stop screw 74 and provided with a positioning wheel 75 which is mounted upon the outer end of the element. The wheel 75 is provided with notches 76 at given positions in its periphery into which the outer end of a latch 77 is adapted to be disposed to locate the inner engaging end of the element 70 at any desired angular position. The latch 77 is pivotally supported, at 78, on the bracket 71 and is held, through the aid of gravity, in the selected notch 76.

Further means is provided to hold the shaft 55 in the selected position including a clamp 80 disposed in a groove 81 of the element 59 and held in place by a screw 82, the latter extending through an elongate aperture 83 in the clamp and mounted in the element 59. Through the aid of this structure, the clamp 80 may be moved longitudinally into and out of clamping position, as illustrated by its solid and dot and dash lines in Fig. 3. A thumb screw 84, threadedly carried by the clamp 80 and movable into engagement with the element 59, is conditioned to cause the clamp to move relative to the head of the screw 82, the latter serving as a fulcrum therefor, to cause movement of the inner end of the clamp into engagement with the forward portion 68 of the shaft 55.

Considering now the function of the apparatus in the assembling of an article, namely a rotor for an electrical condenser, the apparatus may be readily moved from one position to another through the aid of a handle 86 fixed to the upright 11 as illustrated in Fig. 1. Let it be assumed that the clamps 48 and 80 are in their outward positions for the placing of the plates 35 in the unit 17. The plates 35 are substantially semicircular and may be fed beneath the inner projecting end of the locating member 45 and allowed to rest in their respective positions between the locating elements 22 and upon the supports 38. When the desired number of plates has been just positioned, the clamp 48 is moved inwardly and forced into clamping position through the aid of the thumb screw 51. Through this action the plates are moved upon their supports 38 to accurately align them with each other and to axially align the recesses in the central portions 57 thereof. The shaft 55 is then disposed in place as illustrated in Fig. 1 and is forced into position through the aid of the clamp 80, causing the central portions 57 of the plates to rest in their respective annular grooves 56. Prior to the positioning of the clamp 80, the desired angular position of the groove 54 is determined and the element 70 adjusted accordingly through the aid of the locating wheel 75. Once the element 70 is located for the successive assembly of like articles, it need not be again adjusted until articles requiring a different angular position of the slot 69 are to be assembled. However, it is necessary that the element 70 be moved outwardly a short distance against the force of the spring 73 through the aid of the positioning wheel 75, so that the shaft 55 may be disposed in the V-shaped grooves of the supporting elements 58 and 59. This reciprocal movement of the element 70, each time a shaft is disposed in place, can be made without varying the selected location of the element due to the fact that the locating wheel 75 may move relative to the latch 77.

After the parts are assembled, that is, positioned with respect to each other, but before they are secured together, the operator places a strip of solder (not shown) upon each side of the shaft 55, resting upon the adjacent central portions 57 of the plates 35, after which, through the aid of the handle 86, the apparatus is moved to position the parts being assembled adjacent heating means such as gas flames, to cause melting of the solder and the flowing of the melted or liquid solder into the passageways formed about the shaft. In this manner the shaft is secured to each of the plates and the article is completed. The apparatus is then withdrawn from the heating means, the thumb screws 51 and 84 loosened to release the clamps 48 and 80 and allow for the removal of the unit by the outward movement of the element 70.

This operation may be repeated and, as previously described, the supporting elements 38 may from time to time be adjusted or moved about their axes to bring new portions of their peripheries into supporting positions to assure accurate location of the plates 35 relative to the center line of each of the shafts to which they are to be secured. The units may also be adjusted as heretofore described, providing four different areas which may be utilized for the assembly of the articles.

Although specific improvements of the invention have been shown and described, it will be understood that they are but illustrative and that various modifications may be made therein without departing from the scope and spirit of this invention as defined by the appended claims.

What is claimed is:

1. In an assembling apparatus, a unit including spacers, with aligned apertures therein, of given thicknesses spaced like distances apart to form locating pockets therebetween for receiving parts to be assembled, a rod extending through the apertures and pockets to support the parts in the pockets, a locating member having a fixed surface spaced from and disposed parallel with the rod to be engaged by like portions of the parts, a clamp movable into clamping engagement with other like portions of the parts to move them to cooperate with the rod and the surface of the locating member to position and firmly hold the parts in accurate alignment, and means to support an article in a given position relative to the parts for securing of the article thereto.

2. In an assembling apparatus, spaced cylindrical elements to jointly support parts having flat upper surfaces and curved under surfaces, the latter to rest upon the elements, means to support the elements, a locating member having a fixed surface spaced from and disposed parallel with the elements to be engaged by like ends of the flat surfaces of the articles, a clamp movable into clamping engagement with the other ends of the flat surfaces to rotatably slide the parts on the elements until stopped in true alignment with each other in engagement with the locating member, and means to support an article in a given position relative to the parts for securing of the article thereto.

3. In an assembling apparatus, a unit including spacers, with aligned apertures therein, of given thicknesses spaced like distances apart to form locating pockets therebetween for receiving parts to be assembled, spaced cylindrical elements receivable in the said apertures to jointly support parts singly in the pocket, the part engaging portions of the elements substantially tangentially at the assembling position, means to support an article to be secured to the parts, and means to support the unit for the positioning of any one of the pockets at the assembling position.

4. In an assembling apparatus, a unit including spacers, with aligned apertures therein, of given thicknesses spaced like distances apart to form locating pockets therebetween for receiving parts to be assembled, spaced cylindrical elements receivable in the said apertures to jointly support parts singly in the pocket, the part engaging portions of the elements substantially tangentially at the assembling position, means to support an article to be secured to the parts, and means to releasably hold the elements for movement of other portions thereof into the assembling position.

5. In an assembling apparatus, a unit including spacers, with aligned apertures therein, of given thicknesses spaced like distances apart to form locating pockets therebetween for receiving parts to be assembled, spaced cylindrical elements receivable in the said apertures to jointly support parts singly in the pocket, the part engaging portions of the elements substantially tangentially at the assembling position, means to support an article to be secured to the parts, means to support the unit for the positioning of any one of the pockets at the assembling position, and means to releasably hold the elements for movement of other portions thereof into the assembling position.

EARL C. MOSS.
HENRY W. SCHAUFELBERGER.

REFERENCES CITED

The following references are of record in the file of this patent:

UNITED STATES PATENTS

| Number | Name | Date |
| --- | --- | --- |
| 1,576,828 | Jacobson | Mar. 16, 1926 |
| 1,542,995 | Eastham | June 23, 1925 |
| 1,630,993 | West | May 31, 1927 |
| 1,979,856 | Bennett | Nov. 6, 1934 |
| 1,828,027 | Cramer | Oct. 20, 1931 |
| 1,617,577 | Carlson | Feb. 15, 1927 |
| 1,541,058 | Lee | June 9, 1925 |
| 2,364,689 | Brooks | Dec. 12, 1944 |